United States Patent Office 3,004,981
Patented Oct. 17, 1961

3,004,981
PROCESS FOR THE PREPARATION OF
Δ-3,4-THIAZOLINES
Friedrich Asinger, Langebruck, near Dresden, and Max Thiel and Hermann Hauthal, Leuna, Germany, assignors to VEB Leuna-Werke Walter Ulbricht, Leuna, Germany
No Drawing. Filed July 16, 1958, Ser. No. 748,802
Claims priority, application Austria Aug. 9, 1957
9 Claims. (Cl. 260—306.7)

This invention relates to a process for the preparation of Δ-3,4-thiazolines.

It is known that Δ-3,4-thiazolines are obtained when ammonia is allowed to react at room temperature with an equimolar mixture of an α-mercapto-aldehyde or α-mercaptoketone and a keto group (>C=O) containing compound (oxo compound). It has now been found that α-diketo-disulfides can also be converted into Δ-3,4-thiazolines. This reaction is particularly advantageous, when the α-diketo-disulfide is more easily accessible than the corresponding α-mercaptoketone.

The process of the present invention comprises causing a mixture of 1 mole of an α-diketodisulfide with at least 2 moles of an oxo compound, e.g., an aldehyde or ketone, to react simultaneously at room temperature with $H_2S$ and $NH_3$. The $H_2S$ and the $NH_3$ are preferably employed in the proportion by volume of 1:1. In place of ammonia, the ammonium salts of the weaker acids can also be employed. The process can also be carried out so that the mixture of α-diketodisulfide and oxo compound are stirred for several hours with an aqueous ammonium sulfide solution. This process is represented by the following equation:

(1)
$$R_1-CO-\underset{\underset{R_2}{|}}{\overset{\overset{R_3}{|}}{C}}-S-S-\underset{\underset{R_2}{|}}{\overset{\overset{R_3}{|}}{C}}-CO-R_1 + 2\underset{R_5}{\overset{R_4}{\diagdown}}C=O + 2NH_3 + H_2S \longrightarrow$$

$$2 \begin{array}{c} R_1C=\!\!=\!\!N \\ R_2R_3C \diagdown \diagup CR_4R_5 \\ S \end{array} + 4H_2O + S$$

wherein $R_1$, $R_2$ and $R_3$ can be H, alkyl, aralkyl, aryl or cycloalkyl; $R_1$ can be joined with $R_2$ or $R_3$, and $R_2$ with $R_3$ to form a ring structure. $R_4$ and $R_5$ can also be H, alkyl, aralkyl or cycloalkyl, and may be bonded to each other to form a ring structure. These radicals can also contain functional groups such as OH, COOH, etc.

In one aspect of this invention the α-diketodisulfides employed in the process may be described by the general formula (2)
$$R_1-\underset{\underset{O}{\parallel}}{\overset{\overset{R_3}{|}}{C}}-\underset{R_2}{\overset{|}{C}}-S-S-\underset{R_2}{\overset{|}{C}}-\underset{\underset{O}{\parallel}}{\overset{\overset{R_3}{|}}{C}}-R_1$$

wherein $R_1$ is an alkyl radical and $R_2$ and $R_3$ are hydrogen or alkyl. When $R_1$, $R_2$ or $R_3$ are alkyl radicals they may be the same or different alkyl radicals and may be lower or higher alkyl straight chain or branched chain alkyl. Among the alkyl radicals that are represented by $R_1$, $R_2$ and $R_3$ are: methyl; ethyl; n-propyl; iso-propyl; n-butyl; iso-butyl; tert-butyl.

$R_1$, $R_2$ and $R_3$ in Formula 2 may also represent a wide variety of aryl, aralkyl and cycloalkyl radicals. Among the representative radicals are the following: cyclopentyl, cyclohexyl, phenyl and benzyl.

A large variety of aldehydes and ketones may be used in accordance with the process of the present invention. Thus, for example, among the aliphatic and alicyclic aldehydes may be mentioned: acetaldehyde, propionaldehyde, n-butyraldehyde, n-valeraldehyde, trimethylacetaldehyde, cyclohexanealdehyde. Among the substituted aliphatic aldehydes that are useful in the present process are included aldoethers such as ethoxy-acetaldehydes and aldoesters such as β-formyl butyric ester.

A wide variety of substituted and unsubstituted ketones may be used in accordance with the process of the present invention. Thus, for example, ketones of formula $$\underset{R_5}{\overset{R_4}{\diagdown}}C=O$$

wherein $R_4$ and $R_5$ may be the same or different alkyl group. In this case $R_4$ and $R_5$ may be lower or higher alkyl chains and may be straight chain or branched chain. $R_4$ and $R_5$ may also be joined to form a cycloalkyl radical.

Among the aliphatic ketones that are useful may be mentioned acetone, methylethylketone, methyl-n-propylketone, diethyl ketone and methylisobutyl ketone.

Among the alicyclic ketones that may be used in accordance with this invention may be mentioned: cyclopentanone and cyclohexanone.

In a similar manner alkyl-aryl ketones may be used in the process of the present invention. These include, e.g., methyl-benzyl ketone.

As in the case of the aldehydes various substituted ketones may be employed in the process of this invention. The functional groups constituting the substituents are quite varied. Thus, among the hydroxy ketones that have been employed is included propioin (4-hydroxy-3-hexanone).

Another class of substituted ketones that may be used in accordance with the present invention are the keto esters. By way of illustration ω-acetylvaleric acid esters may be mentioned.

The reaction is accelerated by means of small quantities of water; inert solvents such as alcohols, ethers or hydrocarbons have substantially no influence on the reaction.

By the quick introduction of the gas mixture, the temperature tends to rise considerably and it is recommended that the temperature be prevented from exceeding 40° C. by means of cooling. The yield of thiazoline is reduced if the reaction is permitted to take place at higher temperature.

The following examples are further illustrative of the present invention, and it will be understood that the invention is not limited thereto:

Example 1

206 g. of bis(butan-3-one-2-yl)-disulfide and 144 g. of butanone are saturated with $H_2S$ while being stirred. The introduction of $NH_3$ is then begun and the velocity of the two streams of gas ($NH_3$ and $H_2S$) are maintained about equal. The reaction is completed after approximately 4 hours. The reaction mixture consists of two phases. The non-aqueous phase is taken up in ether or another water-insoluble organic solvent, while the aqueous ammonium sulfide containing layer is discarded. The solution is dried and concentrated. The residue yields on distilling 270 g. of 2,4,5-trimethyl-2-ethyl-Δ-3,4-thiazoline of B.P.$_{5\ mm.\ Hg}$ 63–64° C. (85% of theory).

Example 2

234 g. of bis-(pentan-3-one-2-yl)-disulfide and 196 g. of cyclohexanone are treated with $NH_3$ and $H_2S$ and worked up as described in Example 1. One obtains 360 g. of 2,2-pentamethylene-4-ethyl-5-methyl-Δ-3,4-thiazoline of B.P.$_{2.5\ mm.\ Hg}$ 102° C. (91% of theory).

Example 3

$H_2S$ is fed into a mixture of 39 g. of bis(pentan-3-one-2-yl)disulfide, 40 g. diethyl ketone, 100 cc. of methanol and 30 g. of ammonium carbonate for several hours. The reaction mixture is then extracted with ether. The distillation of the ether extract yields 47 g. of 2,2,4-triethyl-5-methyl-Δ-3,4-thiazoline of B.P.$_{3-4\ mm.\ Hg}$ 70–73° C. (76% of theory).

Example 4

45 g. bis-(pentan-3-one-2-yl)-disulfide, 150 g. diethylketone and 200 cc. of a colorless aqueous ammonium sulfide solution containing about 90 g. of S per liter is vigorously stirred for 8 hours, whereby the reaction mixture assumed a reddish yellow color. The organic layer is then separated, washed with water, dried and distilled. One obtains 50 g. of 2,2,4 - triethyl - 5 - methyl-Δ-3,4-thiazoline of B.P.$_{3-4\ mm.\ Hg}$ 70–73° C. (71% of theoretical yield).

Example 5

A mixture of 90 g. bis-acetonyl-disulfide and 58 g. of propionaldehyde is treated with equal quantities of NH$_3$ and H$_2$S as described in Example 1. The reaction mixture is worked up by extraction with petroleum ether. The distillation of the residue obtained after evaporation of the petroleum ether gives 116 g. of 2-ethyl-4-methyl-Δ-3,4-thiazoline of B.P.$_{4\ mm.\ Hg}$ 57–59° C. (90% of theory).

Example 6

H$_2$S is fed into 39 g. of bis(pentan-3-one-2-yl)-disulfide, 47 g. of acetoacetic ester and 26 g. of ammonium acetate for about 8 hours. The ammonium acetate dissolves slowly and sulfur precipitates out in a fine crystalline form. The reaction mixture is extracted with ether. The distillation of the residue obtained after evaporation of the ether gives 60 g. of 2-carbethoxymethyl-2,5-dimethyl-4-ethyl-thiazoline-Δ-3,4 of B.P.$_{5\ mm.\ Hg}$ 120° C. (80% of theory).

Example 7

Ammonia and H$_2$S at a 1:1 ratio are fed into a mixture of 250 g. 4,9-dioxo-6,7-dithia-5,8-diethyldodecane and 174 g. propionaldehyde. The procedure of Example 1 is followed in working up the reaction mixture which yields 315 g. 2,5-diethyl-4-n-propyl-thiazoline-Δ-3,4 having a B.P. of 75–77° C. at 1 mm. The picrate of the compound has a melting point of 97–98° C. The yield corresponds to 85% of the theoretical value.

Example 8

145 g. 3,8 dioxo-5,6-dithia-2,4,4,7,7,9-hexamethyldecane are mixed with 88 g. acetaldehyde and are treated with NH$_3$ and H$_2$S as described above. The reaction product is worked up in the manner described in Example 1. 111 g. (65% of theoretical yield) of 2,5,5-trimethyl-4-isopropyl-thiazoline-Δ-3,4 are obtained and have a boiling point of 63–64° C. at 8 mm. Hg. The picrate melts at 116–118° C.

Example 9

Ammonia and H$_2$S are fed for 8 hours into a mixture of 151 g. diphenacyl disulfide, 60 g. propionaldehyde, and 500 ml. ether. The ether solution is separated from the aqueous polysulfide solution, filtered, washed with water, dried over calcined sodium sulfate, and evaporated to dryness. The residue is recrystallized from methanol. 143 g. (76% of theoretical yield) of 2-ethyl-4-phenyl-thiazoline-Δ-3,4 of M.P. 50–51° C. is obtained.

Example 10

165 g. 2,7-dioxo-4,5-dithia-3,6-diphenyloctane and 116 g. acetone are mixed and are treated with H$_2$S and NH$_3$ as described in Example 1. When the reaction mixture is worked up by the method of Example 1, 158 g. (77% of theoretical yield) of 2,2,4-trimethyl-5-phenyl-thiazoline-Δ-3,4 of B.P.$_4$ 115–117° C. are obtained. The picrate melts at 142° C.

Example 11

A mixture of 130 g. bis-α-cyclohexanonyl disulfide and 100 g. cyclohexanone is treated with H$_2$S and NH$_3$ as indicated in Example 1. The reaction mixture is taken up in ether, the ether solution is dried and evaporated. The crystalline residue is recrystallized from di-n-propyl ether and 188 g. (90% of theoretical yield) of 2,2-pentamethylene-4,5-tetramethylene-thiazoline - Δ - 3,4 are obtained. The melting point of the compound is 83° C.

Example 12

79 g. bis-1- acetylcyclohexyl disulfide and 60 g. diethyl ketone are simultaneously treated with NH$_3$ and H$_2$S and the reaction product is worked up as described in Example 1. 89 g. (81% of theoretical yield) of 2,2-diethyl-4-methyl-5,5-pentamethylene-thiazoline - Δ - 3,4 of B.P.$_4$ 162–163° C. are obtained. The picrate has a melting point of 134–135° C.

Example 13

79 g. bis-hexahydrobenzoylmethyl-disulfide and 75 g. cyclohexanone are treated simultaneously with NH$_3$ and H$_2$S as described in Example 1 above. 103 g. (87% of theoretical yield) of 2,2-pentamethylene-4-cyclohexyl-thiazoline-Δ-3,4 are obtained, having a boiling point at 4 mm. Hg. of 166–168° C. and a melting point of 34° C. The picrate melts at 127–128° C.

Example 14

131 g. 3,8-dioxo-5,6-dithia - 2,2,9,9-tetramethyldecane and 100 g. propionaldehyde are treated with NH$_3$ and H$_2$S at a ratio of 1:1 as described in Example 1, and the reaction product is worked up as indicated there. 156 g. (91% of theoretical yield) of 2-ethyl-4-tert-butyl-thiazoline-Δ-3,4 of B.P.$_{12}$ 86–87° C. are obtained. The picrate melts at 128.5° C.

Example 15

83 g. bis-phenylacetonyl-disulfide, 80 g. phenylacetone and 50 ml. methanol and are mixed and saturated with H$_2$S. H$_2$S and NH$_3$ are fed to the mixture at a volume ratio of 1:1 until the temperature first rises to 50–70° C. and then returns to room temperature. The reaction product is diluted with water and is extracted with ether. The extract is washed with water and dried. It is then evaporated and the residue is distilled in a vacuum. 119 g. (85% of theoretical yield) of 2-methyl-2,4-dibenzyl-thiazoline-Δ-3,4 is obtained and has a B.P.$_1$ of 153–156° C., an M.P. of 67–68° C. The picrate melts at 125° C.

Example 16

A mixture of 117 g. bis-pentan-3-on-2-yl disulfide and 136 g. propioin is diluted with methanol as indicated in Example 15 and is then treated with NH$_3$ and H$_2$S. The reaction product is worked up to yield 145 g. (71% of theoretical yield) of 2-(α-hydroxy-n-propyl)-2,4-diethyl-5-methyl-thiazoline-Δ-3,4.

Example 17

A mixture of 117 g. bis-pentan-3-on-2-yl disulfide and 72 g. isobutyraldehyde are treated with NH$_3$ and H$_2$S as indicated in Example 1. 145 g. (80% of theoretical yield) of 2-isopropyl-4-ethyl-5-methyl-thiazoline-Δ-3,4 of B.P.$_{10}$ 88–90° C. are obtained. The picrate melts at 117–118° C.

Example 18

A mixture of 117 g. bis-pentan-3-on-2-yl disulfide and 120 g. hexahydrobenzaldehyde are treated with NH$_3$ and H$_2$S as described in Example 1. 202 g. (96% of theoretical yield) of 2-cyclohexyl-4-ethyl-5-methyl-thiazoline-Δ-3,4 of B.P.$_2$ 100–110° C. are obtained. The picrate melts at 113–114° C.

Example 19

117 g. bis-pentan-3-on-2-yl disulfide and 180 g. ω-acetylvaleric acid ethyl ester are treated with 500 ml. of an ammonium sulfide solution as described in Example 4 above. The reaction product is worked up as described above and 198 g. (73% of theoretical yield) of 2,5-dimethyl - 2 - (4 - carbethoxy - n - butyl) - 4 - ethyl - thiazoline-Δ-3,4 of B.P.₁ 134–136° C. are obtained.

Example 20

A mixture of 118 g. bis-pentan-3-on-2-yl disulfide with 144 g. β-formylbutyric acid ethyl ester is mixed with 2 ml. water and treated with NH₃ and H₂S as described in Example 1. The reaction product is worked up as indicated above and 190 g. (78% of theoretical yield) of 2 - (1' -methyl - 2' -carbethoxyethyl) - 4 - ethyl - 5-methyl-thiazoline-Δ-3,4 are obtained having a B.P.₁ of 121–123° C.

Example 21

A mixture of 88 g. ethoxyacetaldehyde and 117 g. bis-pentan-3-on-2-yl disulfide is mixed with 250 ml. water and is then treated with NH₃ and H₂S as in Example 1 with vigorous agitation. 141 g. (75% of theoretical yield) of 2-ethoxymethyl-4-ethyl-5-methyl-thiazoline-Δ-3,4 of B.P.₁₀ 114–116° C. are obtained.

Example 22

115 g. bis-α-cyclopentanonyl disulfide and 100 g. cyclopentanone are treated with NH₂ and H₂S as described above. From the reaction product 125 g. (69% of theoretical yield) of 2,2-tetramethylene-4,5-trimethylene-thiazoline-Δ-3,4 are obtained and have a B.P ₀.₂ of 93° C.

The α,α'-diketodisulfides employed in the above examples may be prepared from the corresponding α-mercapto ketones. The α-mercaptoketones in turn may be prepared either from the α-halogen ketones by reaction with Na SH according to O. Hromatka et al. (Mh. Chem. 78, 29, 1947, 85, 830, 1954) and T. Bacchetti et al. (Gazz. chim. ital. 83, 655, 1953; 83, 824, 1953; 83, 1031, 1953) or according to the co-pending U.S. application Ser. No. 615,227. The conversion of the α-mercaptoketones into the disulfides is accomplished with the common oxidizing agents as has been described in connection with simple mercaptanes (see Houben-Weyl, Methoden der organ. Chemie, volume IX, 55, Georg Thieme Verlag, 1955) and F. H. McMillan and J. A. King, Journ. Amer. Chem. Soc. 70, 4143, 1950).

The preparation of the α,α'-diketodisulfides is illustrated by the following two examples.

Example 23

208 g. of ammonium persulfate dissolved in 250 cubic centimeters of water are added dropwise and under stirring at a temperature of 10° C. to a solution containing 250 g. of α-mercapto-diisopropylketone in 68 g. of NaOH and 700 cubic centimeters of water. The reaction mixture thus obtained is stirred for a further 30 minutes whereafter extraction with ether is performed. Distillation of the ether residue yields at a B.P. 2 mm. Hg of 132–134° C., 206 g. of 3,8-dioxo-5,6-dithia-2,4,4,7,7,9-hexamethyldecane (83% of the theory).

Example 24

96 g. of finely comminuted sulfur are added to 708 g. of 2-mercapto-pentanone-(3). Upon stirring a vigorous H₂S development takes place after a short time which persists for 2 to 4 hours. (If desired small amounts of amine may be added as catalyst.) When the sulfur has been consumed, the reaction mixture may immediately be distilled in vacuo. 580 g. of bis-(pentane-3-on-2-yl) disulfide (see Examples 2–4, 6, and 16–20) at a B.P. 5 mm. Hg of 146–149° C., which correspond to 83% of theory, are obtained.

The thiazoline-Δ-3,4 obtained by the inventive reaction exhibit considerable physiological action and may thus be used in the synthesis of therapeutic agents. They constitute valuable intermediates and final products for the pharmaceutical industry. Further, they may be used for many other purposes, as, for example, as agents for combatting pests, as preservatives for the preservation of wood, as weed killers and as protecting agents against rust and aging.

While the invention has been described with particular reference to specific embodiments, it is to be understood that it is not limited thereto, but is to be construed broadly and restricted solely by the scope of the appended claims.

What is claimed is:

1. A process for the preparation of Δ-3,4-thiazolines, which comprises reacting a mixture of H₂S and NH₃ with a mixture of an α,α'-diketodisulfide of the general formula

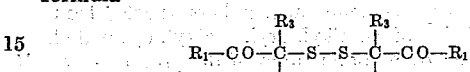

and an oxo compound of the general formula

wherein $R_1$, $R_2$, and $R_3$ represent members selected from the group consisting of H, alkyl, aryl, aralkyl, cycloalkyl, cycloalkyl formed by a combination of the group $R_1$ and one of the groups $R_2$ and $R_3$ and cycloalkyl formed by a combination of $R_2$ and $R_3$, and $R_4$ and $R_5$ are members selected from the group consisting of H, alkyl, alkyl containing substitutents inert in the reaction, aralkyl, cycloalkyl and cycloalkyl having from 5 to 6 carbon atoms formed by a combination of $R_4$ and $R_5$, said members being free from groups which would interfere with the reaction.

2. The process as claimed in claim 1, wherein the α,α'-diketodisulfide and the oxo-compound are employed in the molar ratio of 1:2.

3. The process as claimed in claim 2, wherein the NH₃ and H₂S are present in the ratio of 1 part of NH₃ to 1 part of H₂S by volume.

4. A process as claimed in claim 3, wherein the reaction is carried out at a temperature not exceeding 40° C.

5. A process as claimed in claim 3, wherein the reaction is carried out at ordinary room temperatures.

6. A process as claimed in claim 5, wherein the reaction is carried out in the presence of an inert solvent.

7. A process as claimed in claim 5, wherein the reaction is carried out in the presence of a small quantity of water.

8. A process for the preparation of Δ-3,4-thiazolines, which comprises reacting a mixture of H₂S and an ammonium salt of a weak acid with a mixture of an α,α'-diketodisulfide of the general formula

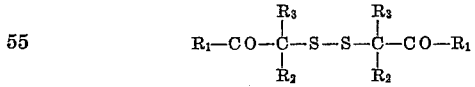

and an oxo compound of the general formula

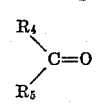

wherein $R_1$, $R_2$, and $R_3$ represent members selected from the group consisting of H, alkyl, aryl, aralkyl, cycloalkyl, cycloalkyl formed by a combination of the group $R_1$ and one of the groups $R_2$ and $R_3$ and cycloalkyl formed by a combination of $R_2$ and $R_3$, and $R_4$ and $R_5$ are members selected from the group consisting of H, alkyl, alkyl containing substituents inert in the reaction, aralkyl, cycloalkyl and cycloalkyl having from 5 to 6 carbon atoms formed by the combination of $R_4$ and $R_5$, said members being free from groups which would interfere with the reaction.

9. A process for the preparation of Δ-3,4-thiazolines, which comprises reacting an ammonium sulfide solution with a mixture of an α,α'-diketodisulfide of the general formula

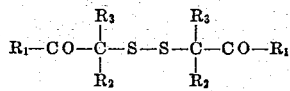

and an oxo compound of the general formula

wherein $R_1$, $R_2$, and $R_3$ represent members selected from the group consisting of H, alkyl, aryl, aralkyl, cycloalkyl, cycloalkyl formed by a combination of the group $R_1$ and one of the groups $R_2$ and $R_3$ and cycloalkyl formed by a combination of $R_2$ and $R_3$, and $R_4$ and $R_5$ are members selected from the group consisting of H, alkyl, alkyl containing substituents inert in the reaction, aralkyl, cycloalkyl and cycloalkyl having from 5 to 6 carbon atoms formed by the combination of $R_4$ and $R_5$, said members being free from groups which would interfere with the reaction.

References Cited in the file of this patent

Asinger: Angew. Chem., vol. 68, p. 413 (1956).
Asinger et al.: Liebigs Ann., vol. 602, pp. 37–49 (1957).
Asinger et al.: Liebigs Ann., vol. 610, pp. 33–49 (1957).
Asinger et al.: Chem. Abstracts, vol. 52, col. 6395 (1958).